(12) United States Patent
Morita

(10) Patent No.: US 11,299,120 B1
(45) Date of Patent: Apr. 12, 2022

(54) SIDE AIRBAG ASSEMBLIES AND METHODS OF ASSEMBLY

(71) Applicant: Autoliv ASP, Inc., Ogden, UT (US)

(72) Inventor: Naoki Morita, Farmington, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/231,827

(22) Filed: Apr. 15, 2021

(51) Int. Cl.
*B60R 21/207* (2006.01)
*B60R 21/231* (2011.01)
*B60R 21/217* (2011.01)

(52) U.S. Cl.
CPC .......... *B60R 21/207* (2013.01); *B60R 21/217* (2013.01); *B60R 21/23138* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 5,536,041 A * | 7/1996 | Acker | ............... | B60R 21/23138 280/740 |
| 5,556,128 A * | 9/1996 | Sinnhuber | ......... | B60R 21/23138 280/739 |
| 7,093,846 B2 * | 8/2006 | Reiter | ................... | B60R 21/205 280/728.2 |
| 7,364,191 B2 * | 4/2008 | Siegel | ................... | B60R 21/261 280/730.2 |
| 7,597,351 B2 * | 10/2009 | Kashiwagi | ............ | B60R 21/261 280/736 |
| 7,793,973 B2 * | 9/2010 | Sato | ................... | B60R 21/23138 280/730.2 |
| 7,926,838 B2 * | 4/2011 | Honda | .............. | B60R 21/23138 280/736 |
| 7,963,556 B2 * | 6/2011 | Loos | ....................... | B60R 21/26 280/740 |
| 8,764,050 B2 * | 7/2014 | Baumgartner | ...... | B60R 21/2171 280/730.2 |
| 9,180,833 B2 * | 11/2015 | Jo | ........................ | B60R 21/2171 |
| 9,545,893 B2 * | 1/2017 | Fujiwara | ............... | B60R 21/207 |
| 2007/0284859 A1 * | 12/2007 | Kashiwagi | ............ | B60R 21/261 280/730.2 |
| 2007/0284862 A1 * | 12/2007 | Kashiwagi | .......... | B60R 21/2346 280/740 |

(Continued)

FOREIGN PATENT DOCUMENTS

JP 2010116134 A * 5/2010
JP 2019059434 A * 4/2019

*Primary Examiner* — Faye M Fleming
(74) *Attorney, Agent, or Firm* — Stoel Rives LLP

(57) ABSTRACT

A side airbag assembly is attachable to a frame of a seat of a vehicle. The side airbag assembly may include an inflatable airbag cushion in a packaged configuration. The inflatable airbag cushion may be inflated by an inflator in fluid communication with the inflatable airbag cushion to supply inflation gas to inflate the inflatable airbag cushion. The inflator may include an attachment stud to mount the airbag assembly to the side of a seat. The side airbag assembly may further include a wrapper configured to wrap around the inflator and the inflatable airbag cushion in the packaged configuration and a cap that is coupled to the wrapper. The cap is configured to enclose a first end of the inflatable airbag cushion in the packaged configuration.

19 Claims, 5 Drawing Sheets

(56) References Cited

U.S. PATENT DOCUMENTS

| | | | |
|---|---|---|---|
| 2009/0039627 A1* | 2/2009 | Yokota | B60R 21/261 |
| | | | 280/730.2 |
| 2011/0316263 A1* | 12/2011 | Lunt | B60R 21/261 |
| | | | 280/730.2 |
| 2014/0210192 A1* | 7/2014 | Hotta | B60R 21/239 |
| | | | 280/730.2 |
| 2015/0246656 A1* | 9/2015 | Fujiwara | B60R 21/23138 |
| | | | 280/730.2 |
| 2022/0009440 A1* | 1/2022 | Schaefer | B60R 21/201 |

* cited by examiner

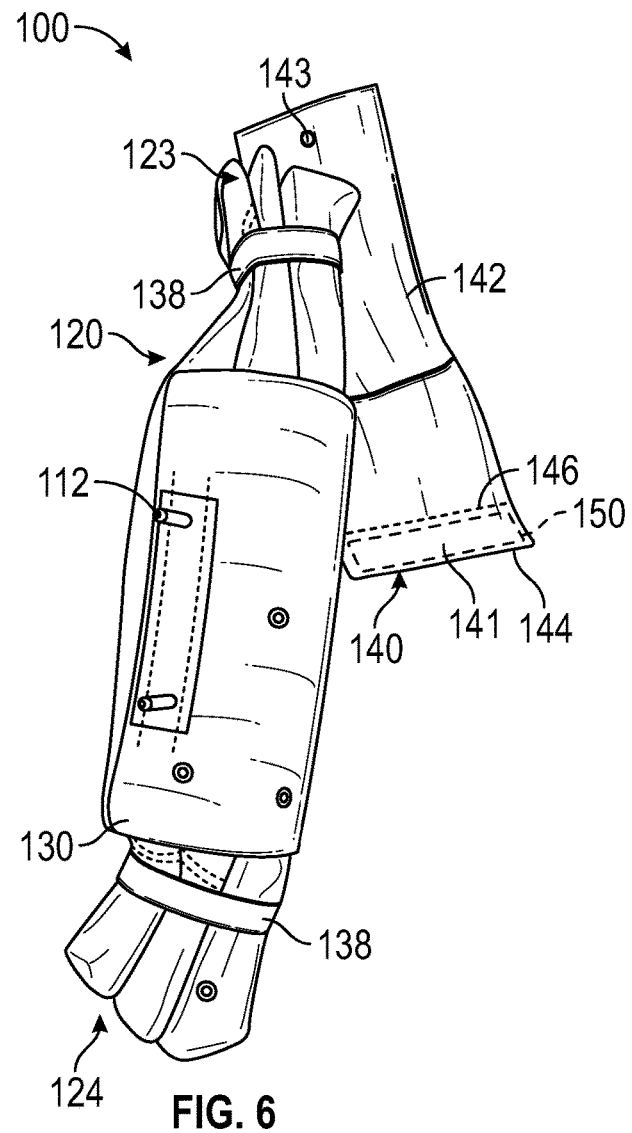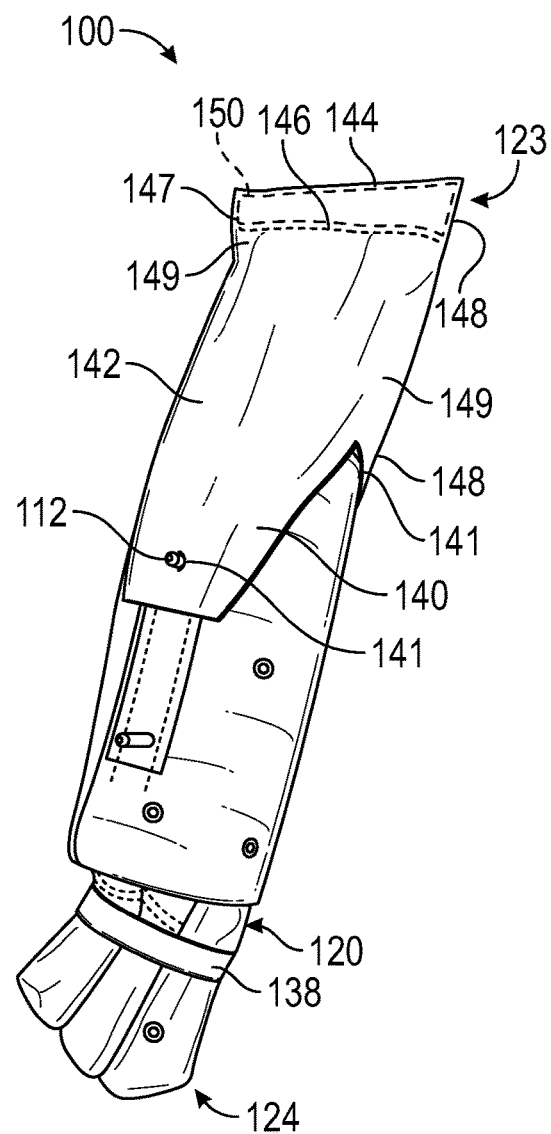
FIG. 6
FIG. 7

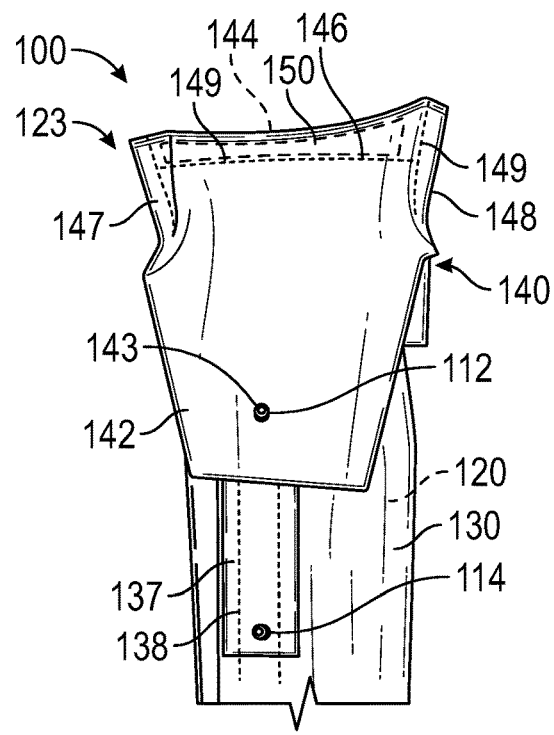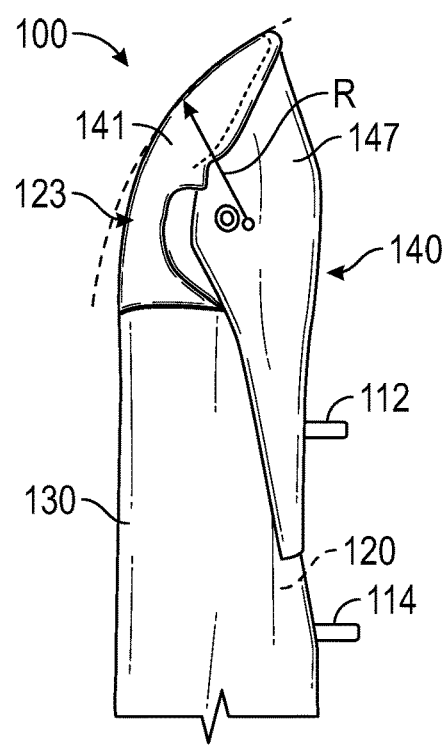
FIG. 8
FIG. 9
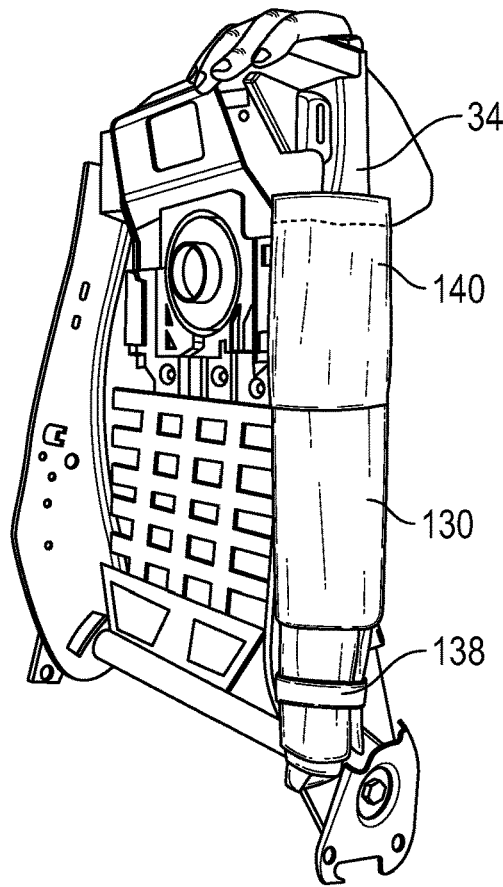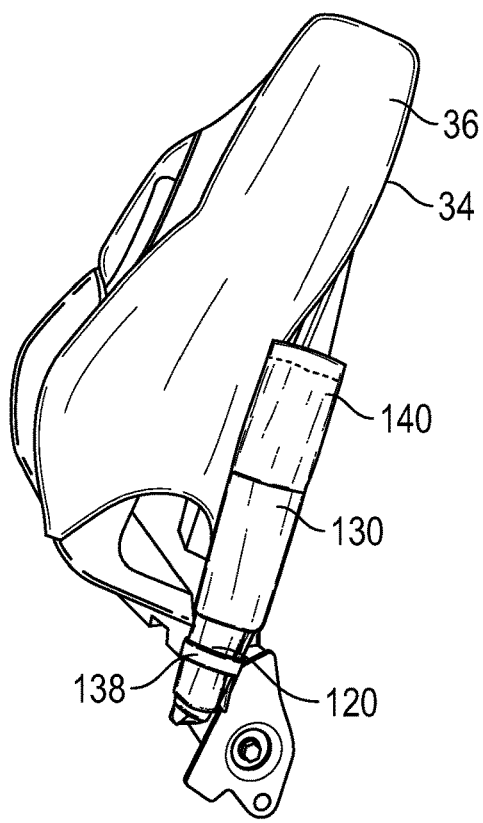
FIG. 10
FIG. 11

SIDE AIRBAG ASSEMBLIES AND METHODS OF ASSEMBLY

TECHNICAL FIELD

The present disclosure relates generally to the field of automotive protective systems. More specifically, the present disclosure relates to side airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 6 is a perspective view of an airbag assembly in a rolled or packaged configuration with a cap not yet enclosing an end of the airbag assembly according to one embodiment of the present disclosure.

FIG. 7 is a perspective view of the airbag assembly of FIG. 6 with the cap enclosing the end of the airbag assembly.

FIG. 8 is a detailed rear view of the airbag assembly in a packaged configuration of FIG. 7.

FIG. 9 is a detailed side view of the airbag assembly of FIG. 7.

FIG. 10 is a perspective view of an airbag assembly coupled to a frame of a seat of a vehicle, according to one embodiment of the present disclosure.

FIG. 11 is a perspective view of the airbag assembly of FIG. 10

DETAILED DESCRIPTION

Figure 1:
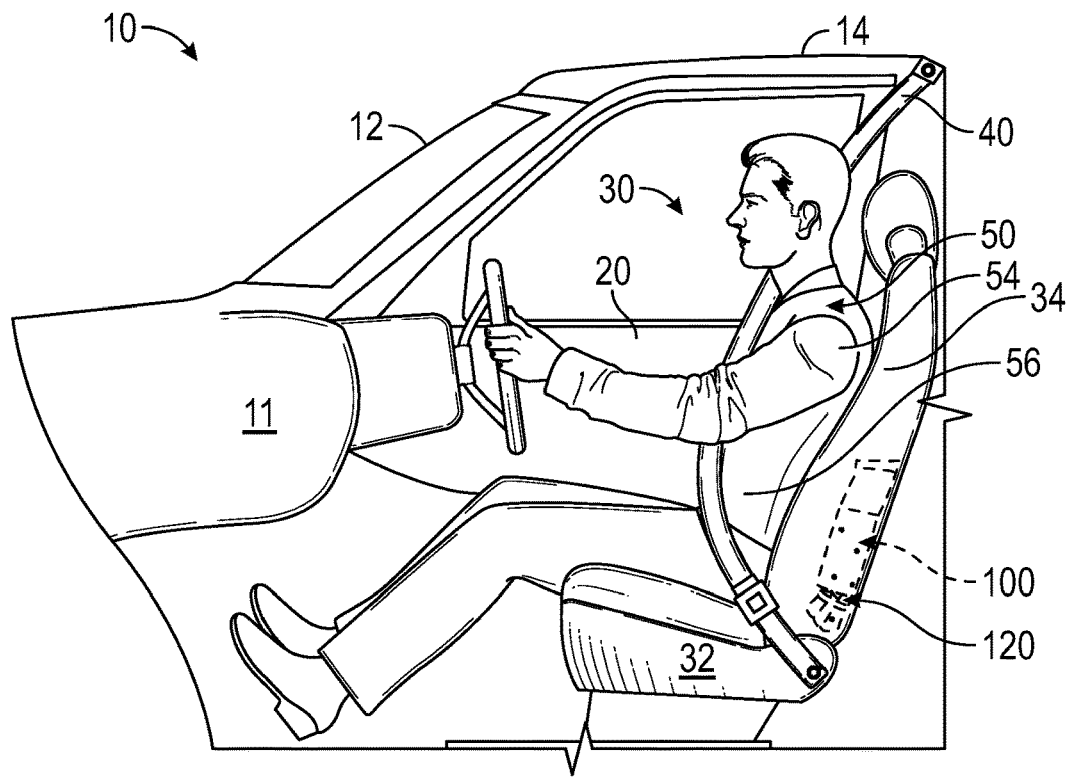
FIG. 1 is a side view of an interior of a vehicle having a side airbag assembly, according to one embodiment of the present disclosure, in a packaged and undeployed state.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. The disclosed airbag assemblies and airbag embodiments may be utilized in place of or in conjunction with other airbags, such as, for example, a front passenger airbag that is typically housed within the dashboard, driver airbags housed within the steering wheel, knee airbags, and side airbags. Further, the disclosed airbag assemblies may be used in an autonomous vehicle (e.g., in a vehicle that may not have a steering wheel and/or that may have limited, or no, reaction surface such as an instrument panel).

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand. An inboard component may be situated opposite an outboard component.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

As used herein, "inboard" refers to a direction toward a centerline of a vehicle, and "outboard" refers to a direction out of the vehicle and away from a centerline of the vehicle.

The phrase "ride down" as used in this disclosure bears the ordinary meaning of the words relative to inflatable airbag systems. That is, "ride down" typically involves an occupant in contact with an inflatable airbag cushion for some period of time during which the inflatable airbag cushion may support and nominally protect to some degree the occupant from impact(s) with some structure(s)/component(s) of a vehicle, and during which the inflatable airbag cushion may partially deflate to ameliorate deceleration forces.

The phrase "fluid communication" is used in its ordinary sense, and is broad enough to refer to arrangements in which a fluid (e.g., a gas or a liquid) can flow from one element to another element when the elements are in fluid communication with each other.

The terms "longitudinal" and "longitudinally" refer to a direction or orientation extending or spanning between a front of a vehicle and a rear of the vehicle.

During installation, the disclosed airbags are typically in a packaged state (e.g., are rolled, folded, and/or otherwise compressed) or a compact configuration and may be retained in the packaged state by a wrapper. During a collision event, an inflator is triggered, which rapidly fills the airbag with inflation gas. The airbag can rapidly transition from a packaged state (e.g., a compact configuration) to a deployed state or an expanded configuration. For example, the expanding airbag can tear open the wrapper. The inflator may be triggered by any suitable device or system, and the triggering may be in response to and/or influenced by one or more vehicle sensors.

FIG. 1 is a side view of an interior of a vehicle 10 having a side airbag assembly 100 in a packaged and undeployed state. A dashboard (or instrument panel) 11, windscreen 12, roof 14, and door 20 are shown for reference. A vehicle seating position 30 is also shown. An occupant 50 is shown in the vehicle seating position 30 in a seated and upright position. In FIG. 1, the vehicle seating position 30 shown is a front driver location; however, embodiments of the disclosure herein may be suitable for other vehicle seating positions 30 within the vehicle 10, such as a front passenger seat, and the like. The vehicle seating position 30 can include an occupant seat 32, a seat back 34, and a restraint harness 40. The side airbag assembly 100 is mounted at an outboard portion of the seat back 34 (proximal to the viewing plane of FIG. 1).

The side airbag assembly 100 may couple at the seat back 34 such that the side airbag assembly 100 may be substantially within the seat back 34 and at a position lateral to the vehicle seating position 30. The seat back 34 may comprise a burst seam that bursts open upon deployment of the side airbag assembly 100, and the side airbag assembly 100 deploys through the burst seam. In some embodiments, an inflatable side airbag cushion 120 may be folded, rolled, and the like in the compressed state.

Figure 2:
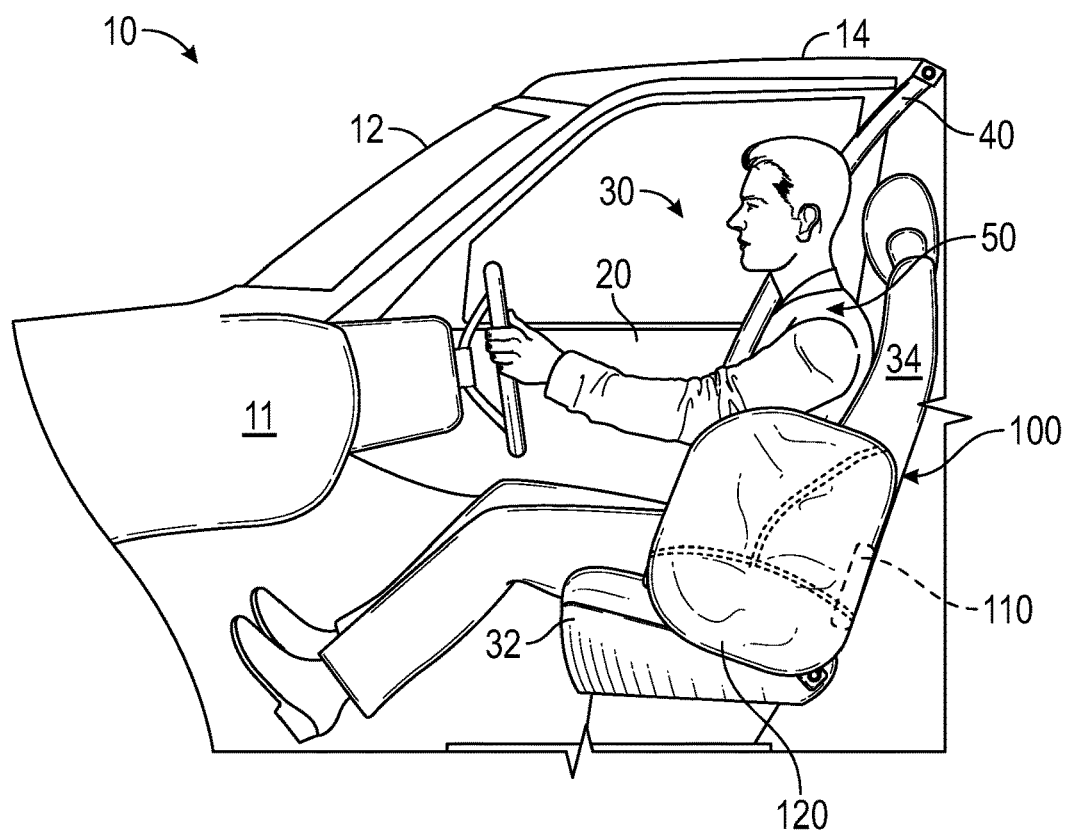
FIG. 2 is a side view of the airbag assembly of FIG. 1 in a deployed state during a vehicle impact event.

FIG. 2 is a side view of the interior of the vehicle 10 having the side airbag assembly 100, with the inflatable side airbag cushion 120 in a deployed state and at least partially inflated, and with the occupant 50 seated in an upright position in the vehicle seating position 30. The side airbag assembly 100 may include an inflator 110, the inflatable side airbag cushion 120, a wrapper (not shown, but see, e.g., 130 in FIG. 4), and a cap (not shown, but see, e.g., 140 in FIG. 4). In some embodiments, the side airbag assembly 100 may couple at an inboard portion of the seat back 34.

During a collision event, the inflator 110 may be triggered or activated, which rapidly fills the inflatable side airbag cushion 120 to at least partially inflate the inflatable side airbag cushion 120. The inflatable side airbag cushion 120 may deploy from the seat back 34 through the burst seam to a position approximately lateral to the occupant 50. In some embodiments, the inflatable side airbag cushion 120 deploys to an outboard side of the occupant 50. In the illustrated embodiment of FIG. 2, the inflatable side airbag cushion 120 comprises a single chamber. However, the present disclosure is not so limited. The inflatable side airbag cushion 120 may comprise a plurality of chambers.

With the inflatable side airbag cushion 120 deployed, the inflatable side airbag cushion 120 may be configured to receive at least a portion of a torso 56 of the occupant 50 as the occupant 50 moves from the vehicle seating position 30. In the embodiment of FIG. 2, a shoulder 54 of the occupant 50 may be above the height of the inflatable side airbag cushion 120. A configuration such as that shown in FIG. 2 may be particularly suited to use in a vehicle 10 having an inflatable curtain such that the inflatable side airbag cushion 120 and the inflatable curtain do not interfere with each other, but, rather, augment each other. The inflatable side airbag cushion 120 may be suitable for a frontal collisions, oblique collisions, and/or side collisions.

Figure 3:
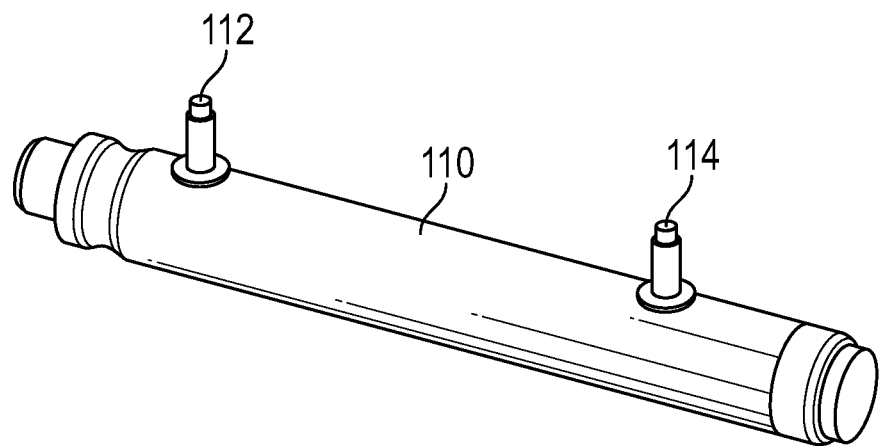
FIG. 3 is a perspective view of an inflator of a side airbag assembly according to one embodiment of the present disclosure.

FIG. 3 illustrates a perspective view of the inflator 110 according to one embodiment of the present disclosure. The inflator 110 may be an appropriate airbag inflator for the purpose of inflating the inflatable side airbag cushion 120. The inflator 110 can include a gas canister, a chemical container, or other method for generation of inflation gas, and any conduit(s) or ducting (plumbing) for delivering or supplying inflation gas to the inflatable side airbag cushion 120, and other components related to generation and delivery of inflation gas. In other words, the inflator 110 is in fluid communication with the inflatable side airbag cushion 120.

In some embodiments, the inflator 110 is disposed within the inflatable side airbag cushion 120. In some embodiments, the inflator is partially disposed within the inflatable side airbag cushion 120.

The inflator 110 may comprise a mounting point. The mounting point may comprise an attachment stud for attaching the inflator 110 to a frame of the seat back 34. In the illustrated embodiment of FIG. 3, the inflator 110 comprises a first attachment stud 112 and a second attachment stud 114 that are spaced apart. However, the current disclosure is not so limited, and the inflator 110 may comprise more or less than two attachment studs. The attachment studs 112 and 114 are used to attach the side airbag assembly 100 to the frame of the seat back 34 of vehicle seating position 30.

Figure 4:
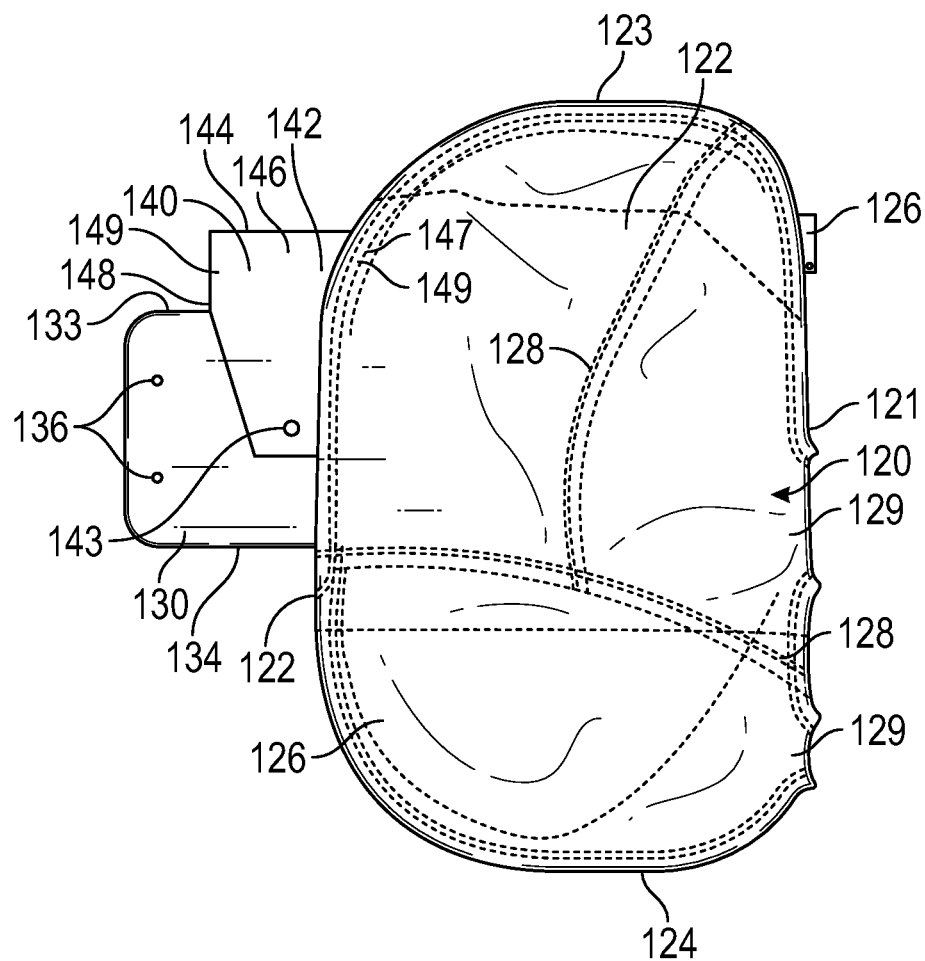
FIG. 4 is a rear view of an airbag assembly in an unassembled configuration, according to one embodiment of the present disclosure.
Figure 5:
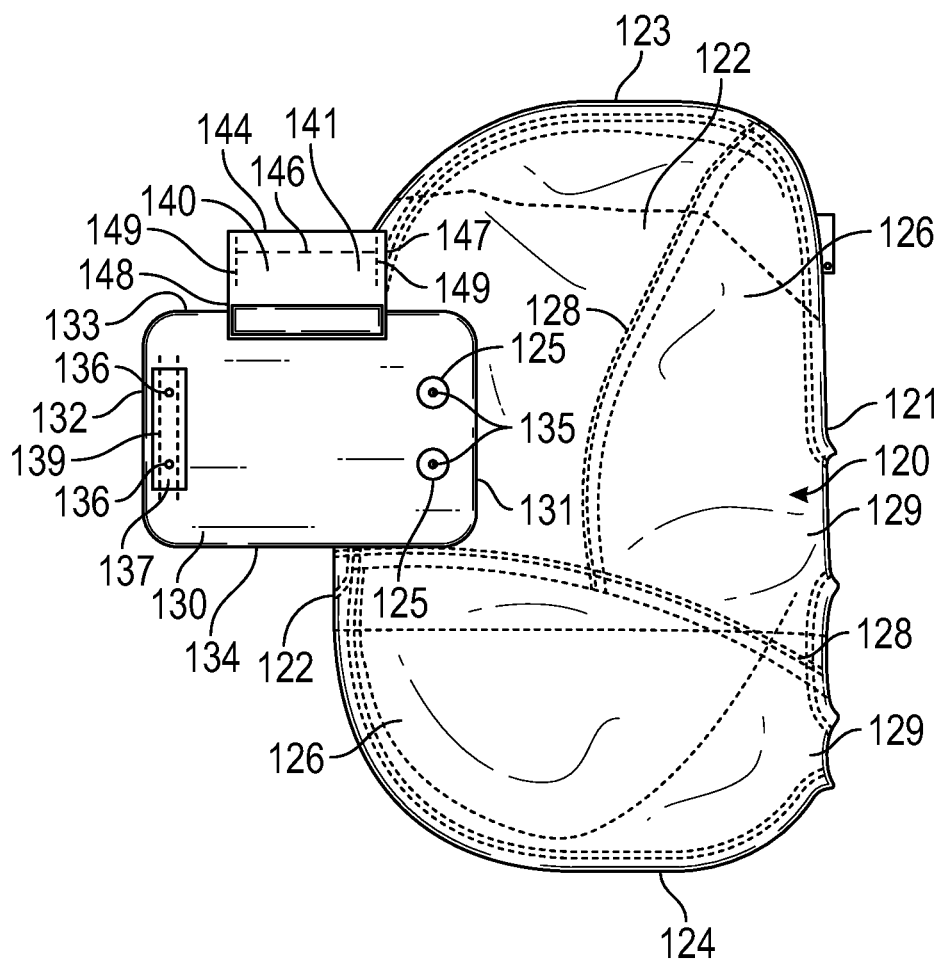
FIG. 5 is a front view of the airbag assembly of FIG. 4 in an unassembled configuration.

FIG. 4 illustrates a front view of the inflatable side airbag cushion 120, the wrapper 130, and the cap 140 in an unpackaged configuration. FIG. 5 illustrates a rear view of the inflatable side airbag cushion 120, the wrapper 130, and the cap 140 of FIG. 4 in the unpackaged configuration.

The inflatable side airbag cushion 120 may comprise a substantially oval shape. However, the present disclosure is not so limited and the inflatable side airbag cushion 120 may be circular, triangular, polygonal and/or other shapes. The inflatable side airbag cushion 120 may comprise a first lateral end 121, a second lateral end 122, an upper end 123, and a lower end 124. One of the lateral ends 121 and 122 may comprise a plurality of apertures 125. The plurality of apertures 125 may be spaced apart (e.g., so as to be vertically spaced apart when installed in a vehicle seat) and are configured to receive the plurality of attachment studs 112 and 114 of the inflator 110. The number of apertures 125 in the inflatable side airbag cushion 120 may correspond with the number of attachment studs 112 and 114 on the inflator 110. The apertures 125 are spaced apart a similar distance as the attachment studs 112 and 114 of the inflator 110 are spaced apart. In the illustrated embodiment, the plurality of apertures 125 are disposed on the second lateral end 122 of the inflatable side airbag cushion 120. Alternatively, the plurality of apertures 125 may be disposed on the first lateral end 121 of the inflatable side airbag cushion 120.

In some embodiments, the inflator 110 is disposed within the inflatable side airbag cushion 120. In some embodiments, the inflator 110 is disposed outside the inflatable side airbag cushion 120. In some embodiments, the inflator 110 is partially disposed within and outside the inflatable side airbag cushion 120.

The inflatable side airbag cushion 120 may be formed from one or more panels 126 of suitable material by means of cutting, folding, bending, turning or otherwise shaping such material, and by application of seams 128 at appropriate locations. The seams 128 may be formed by sewing, adhesive, taping, radio frequency (RF) welding, or any other suitable means. The seams 128 may be gas impermeable, semipermeable, or permeable, as appropriate. The inflatable side airbag cushion 120 may be configured to receive inflation gas from the inflator 110 (not shown) to expand the inflatable side airbag cushion 120 from a packaged state to a deployed state. The inflatable side airbag cushion 120 may further comprise a plurality of vents 129 to vent the gas during ride down of the inflatable side airbag cushion 120.

The inflatable side airbag cushion 120 is configured to collapse into a packaged state. As discussed above, the inflatable side airbag cushion 120 may be folded, rolled, and the like. In one embodiment, the inflatable side airbag cushion 120 may be rolled laterally from the first lateral end 121 toward the second lateral end 122 to form a rolled configuration.

The wrapper 130 is configured to wrap around the inflatable side airbag cushion 120 and the inflator 110 in the rolled configuration. The wrapper 130 comprises a substantially rectangular shape with a first lateral end 131, a second lateral end 132, an upper end 133, and a bottom end 134. The first lateral end 131 and the second lateral end 132 may both comprise a plurality of apertures 135 and 136 that are vertically spaced apart. The number of apertures 135 on the first lateral end 131 and the number of apertures 136 on the second lateral end 132 correspond with the number of attachment studs 112 and 114 on the inflator 110. The apertures 135 and 136 are configured to receive the attachment studs 112 and 114 of the inflator 110. The apertures 135 and 136 are vertically spaced apart a similar distance as the attachment studs 112 and 114 of the inflator 110.

In some embodiments, the apertures 135 and 136 may be reinforced by additional material and stitching. As illustrated in FIG. 5, a reinforcement material 137 is aligned with the plurality of apertures 136 and secured to the wrapper 130 via stitching 139. The reinforcement material 137 and the stitching 139 reinforce the apertures 136 from tearing from the attachment studs 112 and 114 of the inflator 110 before deployment of the inflatable side airbag cushion 120.

To wrap the inflatable side airbag cushion 120, the apertures 135 of the first lateral end 131 of the wrapper 130 are placed on the plurality of attachment studs 112 and 114. The wrapper 130 is then wrapped around the inflatable side airbag cushion 120 in the rolled or packaged configuration, and the apertures 136 of the second lateral end 132 are placed on the plurality of attachment studs 112 and 114. Accordingly, the inflatable side airbag cushion 120 is held in the rolled or packaged configuration by the wrapper 130 until deployment of the inflatable side airbag cushion 120. The wrapper 130 is configured to burst or otherwise break during deployment (and expansion) of the inflatable side airbag cushion 120. The wrapper 130 may be formed of a suitable flexible material, such as a ductile fabric material. In some embodiments, the material may comprise a plurality of polymeric fibers.

In some embodiments, the upper end 123 and the lower end 124 of the inflatable side airbag cushion 120 in the rolled configuration may be wrapped by an additional wrapper 138, as illustrated in FIGS. 6 and 7. The additional wrapper 138 may slide over the upper end 133 and another wrapper may slide over the lower end 134. In some embodiments, only the upper end 133 has the additional wrapper 138 or only the lower end 134 has the additional wrapper 138. The additional wrapper 138 is configured to secure the inflatable side airbag cushion 120 in the rolled configuration until deployment. The additional wrapper 138 is configured to break during deployment to allow the inflatable side airbag cushion 120 to deploy.

In some embodiments the additional wrapper 138 is an adhesive that is taped around the upper end 133 and the lower end 134. The additional wrapper 138 is configured to break during deployment to allow the inflatable side airbag cushion 120 to deploy.

In the packaged configuration, the packaged inflatable side airbag cushion 120 comprises the upper end 123 and the lower end 124. The cap 140 is configured to enclose one of the ends 123 and 124 of the inflatable side airbag cushion 120. In the illustrated embodiment, the cap 140 encloses the upper end 123. The cap 140 may be coupled to the upper end 133 of the wrapper 130. In some embodiments, the cap 140 is integral with the wrapper 130. The cap 140 may be formed of a suitable flexible material, such as a ductile fabric material. In some embodiments, the material may comprise a plurality of polymeric fibers. The material for the cap 140 and the material for the wrapper 130 may be the same material.

The cap 140 comprises a first panel 141 and a second panel 142. The first panel 141 may be coupled to the upper end 133 of the wrapper 130 in a center portion of the wrapper. The second panel 142 may have a greater length (e.g., vertical direction) than the first panel 141. In some embodiments, the cap 140 comprises a single piece or sheet of material that is folded back upon itself along a fold 144 forming the first panel 141 and the second panel 142.

The first panel 141 may be coupled to the upper end 133 of the wrapper 130 via stitching, an adhesive, or the like. In some embodiments, the first panel 141 is integral with the wrapper 130. The second panel 142 is configured to couple to one of the plurality of attachment studs 112 and 114 of the inflator 110. For example, the second panel 142 may comprise an aperture 143 that is configured to receive one of the attachment studs 112 and 114 of the inflator 110. In some embodiments, the second panel 142 may comprise a plurality of apertures that are configured to receive a corresponding attachment stud of the plurality of attachment studs 112 and 114 of the inflator 110. The number of apertures in the second panel 142 may correspond with the number of attachment studs of the inflator 110.

The cap 140 may comprise a horizontal stitching seam 146 that extends substantially from a first lateral edge 147 to a second lateral edge 148 of the cap 140. The horizontal stitching seam 146 is configured to couple the first panel 141 to the second panel 142. The horizontal stitching seam 146 may be disposed a predetermined distance from the fold 144.

The cap 140 may further comprise a pair of lateral stitching seams 149 that are disposed in the first lateral edge 147 and the second lateral edge 148. The lateral stitching seams 149 may extend a majority of the length of the first panel 141.

The horizontal stitching seam 146 and the lateral stitching seams 149 provide some rigidity to the cap 140 to help prevent the cap 140 from being bent over during the assembly of the seat back 34 of the vehicle seating position 30. For example, the cap 140 may have a predetermined amount of stiffness to prevent the upper end of the side airbag assembly 100 from being bent over during the manufacture of the seat back 34. The degree of stiffness counters forces on the cap 140 when foam for the seat slides into place on a frame of the seat, discussed below. Thereby preventing an upper end 123 of the side airbag assembly 110 from bending over.

FIG. 6 illustrates the side airbag assembly 100 in a partially assembled configuration. The cap 140 is not pulled over the upper end 123 of the inflatable side airbag cushion 120 in the rolled configuration. FIG. 7 illustrates the side airbag assembly 100 in an assembled configuration with the cap 140 encompassing the upper end 123 of the inflatable side airbag cushion 120 in the rolled configuration. The aperture 143 of the second panel 142 is placed over the attachment stud 112 of the inflator 110.

In some embodiments, a rigid member 150 may be inserted in between the first panel 141 and the second panel 142 and between the fold 144 and the horizontal stitching seam 146. The rigid member 150 may be secured in place by the horizontal stitching seam 146. The rigid member 150 is illustrated in phantom lines because it is not visible between the first panel 141 and the second panel 142. The rigid member 150 provides rigidity to the cap 140 to help prevent the cap 140 from being bent over during the manufacture of the seat back 34. The rigid member 150 may be fabricated from any suitable material that provides enough stiffness to strengthen the cap 140.

FIG. 8 illustrates a detailed rear view of the side airbag assembly 100 in the assembled configuration with the cap 140 disposed over the upper end 123 of the inflatable side airbag cushion 120. FIG. 9 illustrates a detailed side view of the side airbag assembly 100 in the assembled configuration with the cap 140 disposed over the upper end 123 of the inflatable side airbag cushion 120. The second panel 142 of the cap may comprise a curve. The curve of the second panel 142 may have a radius of curvature R, as illustrated in FIG. 9. In some embodiments, the curve may be a compound curve.

FIG. 10 illustrates the side airbag assembly 100 in the assembled configuration coupled to a frame of the seat back 34 of the vehicle seating position 30. Only a rear view of the side airbag assembly 100 is visible as the front side of the side airbag assembly 100 is coupled to the frame of the seat back 34. The side airbag assembly 100 is coupled to the frame via the attachment studs 112 and 114 of the inflator 110 (not shown in FIG. 10).

After the side airbag assembly 100 is attached to the frame of the seat back 34, a foam pad 36 may be attached to the seat back 34. FIG. 11 illustrates the foam pad 36 attached to the seat back 34. During installation, the foam pad 36 is typically slid over the frame of the seat back 34. The cap 140 is designed to prevent the inflatable side airbag cushion 120 from being bent over when the foam pad 36 is slid into place on the frame of the seat back 34. This is accomplished through a number of different features of the side airbag assembly 100. For example, the stiffness of the cap 140 prevents the inflatable side airbag cushion 120 from being bent over. In addition, the radius of curvature R of the cap 140 guides the foam pad 36 into place on the frame.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite an airbag having "a chamber," the disclosure also contemplates that the airbag can have two or more chambers.

As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "vehicle seating position" refers to a position in which an occupant is generally positioned when seated in a seat of a vehicle. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An airbag assembly in a packaged state comprising:
an inflatable airbag cushion in a packaged configuration;
an inflator in fluid communication with the inflatable airbag cushion to supply inflation gas to inflate the inflatable airbag cushion, the inflator comprising an attachment stud to mount the airbag assembly to a side of a seat;
a wrapper configured to wrap around the inflator and the inflatable airbag cushion in the packaged configuration; and
a cap coupled to the wrapper, wherein the cap is configured to enclose a first end of the inflatable airbag cushion in the packaged configuration to increase stiffness at the first end.

2. The airbag assembly of claim 1, wherein the wrapper comprises a substantially rectangular shape to wrap around the inflatable airbag cushion in the packaged configuration, the rectangular shape including a first lateral end and a second lateral end, the first lateral end including a first aperture to secure the first lateral end at the attachment stud and the second lateral end including a second aperture to secure the second end at the attachment stud.

3. The airbag assembly of claim 1, wherein the inflator comprises a plurality of attachment studs that are spaced apart, and
wherein the wrapper comprises a substantially rectangular shape, the wrapper comprises a first lateral end and a second lateral end each including one or more apertures of a plurality of apertures spaced apart, wherein each aperture of the one or more apertures is configured to receive one of the plurality of attachment studs of the inflator.

4. The airbag assembly of claim 1, wherein the cap comprises a predetermined amount of stiffness to prevent an upper portion of the airbag assembly from bending over when a foam pad for the seat slides into place on a frame of the seat.

5. The airbag assembly of claim 1, wherein the cap is formed to provide a degree of stiffness to counter forces on the cap, and thereby prevent an upper portion of the airbag assembly from bending over, when a foam pad for the seat slides into place on a frame of the seat.

6. The airbag assembly of claim 1, wherein the cap comprises a single sheet of material that is folded back upon itself along a fold forming a first panel and a second panel, wherein the first panel of the cap is coupled at a center portion of the wrapper and the second panel of the cap is coupled to the attachment stud of the inflator.

7. The airbag assembly of claim 6, wherein the second panel comprises an aperture that is configured to receive the attachment stud of the inflator.

8. The airbag assembly of claim 6, wherein the cap comprises a horizontal stitching seam that extends substantially from a first lateral edge of the cap to a second lateral edge of the cap.

9. The airbag assembly of claim 8, wherein the horizontal stitching seam is disposed a predetermined distance from the fold.

10. The airbag assembly of claim 6, wherein the cap comprise a pair of lateral stitching seams that extend along a first lateral edge of the cap and a second lateral edge of the cap, wherein the pair of lateral stitching seams couple the first panel to the second panel of the cap.

11. The airbag assembly of claim 6, wherein the second panel has a greater length than the first panel.

12. The airbag assembly of claim 6, wherein the first panel of the cap comprises a radius of curvature that is configured to guide foam for the seat when the foam is slid into place on a frame of the seat without bending an upper portion of the airbag assembly.

13. The airbag assembly of claim 1, wherein the wrapper and the cap are fabricated from a flexible material.

14. The airbag assembly of claim 1, wherein the inflator comprises two attachment studs that are vertically spaced apart.

15. A method of packaging a side airbag assembly comprising:

obtaining an inflatable side airbag cushion with an inflator coupled to and in fluid communication with the inflatable side airbag cushion;

rolling the inflatable side airbag cushion;

wrapping the inflator and the rolled inflatable side airbag cushion with a wrapper; and enclosing a first end of the rolled inflatable side airbag cushion with a cap, wherein the cap comprises a predetermined amount of stiffness to prevent an upper portion of the rolled inflatable side airbag cushion from bending over when foam for a seat is slid into place on a frame of the seat.

16. The method of claim 15, wherein the inflator comprises two attachment studs to mount the side airbag assembly to a side of a seat of a vehicle, wherein the two attachment studs are vertically spaced apart.

17. The method of claim 16, wherein the wrapper comprises a substantially rectangular shape, the wrapper comprises a first lateral end and a second lateral end with two apertures disposed in the first lateral end and the second lateral end with the apertures vertically spaced apart, wherein each aperture in each end is configured to receive one of the two attachment studs of the inflator.

18. The method of claim 17, wherein the cap comprises a single sheet of material that is folded back upon itself along a fold forming a first panel and a second panel, wherein the first panel of the cap is coupled to a center portion of the wrapper and the second panel of the cap comprises an aperture that is configured to receive one of the attachment studs of the inflator.

19. The method of claim 15, further comprising mounting the side airbag assembly to a side of a seat of a vehicle.

\* \* \* \* \*